(12) United States Patent
Shankar

(10) Patent No.: US 11,328,170 B2
(45) Date of Patent: May 10, 2022

(54) UNKNOWN OBJECT IDENTIFICATION FOR ROBOTIC DEVICE

(71) Applicant: TOYOTA RESEARCH INSTITUTE, INC., Los Altos, CA (US)

(72) Inventor: Krishna Shankar, Los Altos, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 16 days.

(21) Appl. No.: 16/795,242

(22) Filed: Feb. 19, 2020

(65) Prior Publication Data

US 2021/0256300 A1    Aug. 19, 2021

(51) Int. Cl.
*G06K 9/62* (2022.01)
*G06V 10/56* (2022.01)
*G06V 20/10* (2022.01)

(52) U.S. Cl.
CPC .......... *G06K 9/6215* (2013.01); *G06V 10/56* (2022.01); *G06V 20/10* (2022.01)

(58) Field of Classification Search
USPC .......................... 382/103, 153, 181, 190, 224
See application file for complete search history.

(56) References Cited

U.S. PATENT DOCUMENTS

| 5,915,250 | A  | * | 6/1999 | Jain | G06F 16/532 |
| 6,636,619 | B1 |   | 10/2003 | Zhang et al. | |
| 7,152,050 | B2 |   | 12/2006 | Aoyama et al. | |
| 8,063,815 | B2 |   | 11/2011 | Valo et al. | |
| 8,340,412 | B2 | * | 12/2012 | Lang | G06F 16/5862 382/165 |
| 8,533,162 | B2 | * | 9/2013 | Klinkigt | G06K 9/6211 707/669 |
| 8,971,610 | B2 | * | 3/2015 | Kashiwagi | G06K 9/6247 382/154 |
| 9,064,161 | B1 |   | 6/2015 | Boman et al. | |
| 9,171,195 | B1 | * | 10/2015 | Rybakov | G06K 9/6807 |
| 9,652,688 | B2 | * | 5/2017 | Jean | G06F 16/5854 |
| 9,710,706 | B2 |   | 7/2017 | Francois et al. | |
| 10,109,051 | B1 | * | 10/2018 | Natesh | G06K 9/4652 |
| 10,354,406 | B2 | * | 7/2019 | Posner | G06K 9/6203 |
| 10,754,318 | B2 | * | 8/2020 | Nagarajan | G05B 19/124 |
| 10,769,503 | B1 | * | 9/2020 | Buhler | G06F 16/71 |
| 10,810,792 | B2 | * | 10/2020 | Kehl | G01C 21/32 |

(Continued)

FOREIGN PATENT DOCUMENTS

CN    108021131 A    5/2018

OTHER PUBLICATIONS

Zhu et al., Edge based Multi-view Object Recognition, 2000, IEEE 0-965-0750-6/00, pp. 936-939. (Year: 2000).*

(Continued)

*Primary Examiner* — Ishrat I Sherali
(74) *Attorney, Agent, or Firm* — Seyfarth Shaw LLP

(57) ABSTRACT

A method for identifying objects includes generating a feature vector of an unknown object from an image of an environment. The method also includes comparing the feature vector of the unknown object to feature vectors of known objects. The method further includes determining whether a similarity between the feature vector of the unknown object and the feature vector of one of the known objects satisfies a threshold. Furthermore, the method includes identifying the unknown object based on the determination.

12 Claims, 6 Drawing Sheets

(56) References Cited

U.S. PATENT DOCUMENTS

| | | | | |
|---|---|---|---|---|
| 10,916,135 | B2* | 2/2021 | Guo | H04W 4/46 |
| 2006/0020597 | A1* | 1/2006 | Keating | G06F 16/5838 |
| 2006/0253406 | A1* | 11/2006 | Caillon | G06K 9/46 |
| | | | | 705/410 |
| 2012/0083285 | A1* | 4/2012 | Shatsky | H04W 4/38 |
| | | | | 455/456.1 |
| 2013/0080371 | A1* | 3/2013 | Harber | G06F 16/686 |
| | | | | 706/50 |
| 2014/0270536 | A1* | 9/2014 | Amtrup | G06K 9/00483 |
| | | | | 382/195 |
| 2015/0055855 | A1* | 2/2015 | Rodriguez | G06K 9/627 |
| | | | | 382/159 |
| 2017/0185675 | A1* | 6/2017 | Arngren | G06F 21/10 |
| 2017/0243230 | A1* | 8/2017 | Ross | G06F 16/5866 |
| 2018/0005035 | A1* | 1/2018 | Bogolea | G06K 9/2063 |
| 2018/0032796 | A1* | 2/2018 | Kuharenko | G06F 16/5838 |
| 2019/0197396 | A1* | 6/2019 | Rajkumar | G06N 3/08 |
| 2020/0082212 | A1* | 3/2020 | Alcock | G06K 9/46 |
| 2020/0156246 | A1* | 5/2020 | Srivastav | B25J 9/163 |
| 2020/0167614 | A1* | 5/2020 | Visentini Scarzanella | |
| | | | | G06K 9/6282 |
| 2020/0311452 | A1* | 10/2020 | McConnell | G06K 9/2018 |
| 2020/0356772 | A1* | 11/2020 | Withrow | G06K 9/00617 |
| 2021/0027058 | A1* | 1/2021 | Ma | G06K 9/6202 |

OTHER PUBLICATIONS

Attamimi et al., Visual Recognition Systems for Cleaning Tasks by Humanoid Robots, International Journal of Advanced Robotics systems 2013, vol. 10 384:2013, pp. 1-14. (Year: 2013).*

Towards Shape-Based Visual Object Categorization for Humanoid Robots, IEEE 978-1-61284-385-811, pp. 5226-5232. (Year: 2011).*

Hermans, et al.,"Affordance Prediction Via Learned Object Attributes", citeseerx.ist.psu.edu, May 26, 2018, pp. 1-8.

* cited by examiner

UNKNOWN OBJECT IDENTIFICATION FOR ROBOTIC DEVICE

BACKGROUND

Field

Certain aspects of the present disclosure generally relate to robotic devices and, more particularly, to a system and method for teaching a robotic device unknown objects through visual recognition and analysis of elements of an already learned object.

Background

As robotic assistance technology improves, robots may be programmed to execute a wide variety of tasks people perform in an environment, such as a house. Conventionally, a classifier identifies an object by training the classifier with a training set that includes instances of the specific object. In such cases, when the classifier is confronted with an object that is not included in the training set, the classifier selects the closest known object. However, this selection may be incorrect. It is desirable to improve classifiers to identify unknown objects based on elements and features of learned/known objects.

SUMMARY

A method for identifying objects includes generating a feature vector of an unknown object from an image of an environment. The method also includes comparing the feature vector of the unknown object to feature vectors of known objects. The method further includes determining whether a similarity between the feature vector of the unknown object and the feature vector of one of the known objects satisfies a threshold. Furthermore, the method includes identifying the unknown object based on the determination.

A system for identifying objects is described. The system having a memory and one or more processors coupled to the memory. The processor(s) is configured to generate a feature vector of an unknown object from an image of an environment. The processor(s) is also configured to compare the feature vector of the unknown object to feature vectors of known objects. The processor(s) is further configured to determine whether a similarity between the feature vector of the unknown object and the feature vector of one of the known objects satisfies a threshold. Furthermore, the processor is configured to identify the unknown object based on the determination.

A non-transitory computer-readable medium with non-transitory program code recorded thereon is described. The program code to identify objects. The program code is executed by a processor and includes program code to generate a feature vector of an unknown object from an image of an environment. The program code also includes program code to compare the feature vector of the unknown object to feature vectors of known objects. The program code further includes program code to determine whether a similarity between the feature vector of the unknown object and the feature vector of one of the known objects satisfies a threshold. Furthermore, the program code includes program code to identify the unknown object based on the determination.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
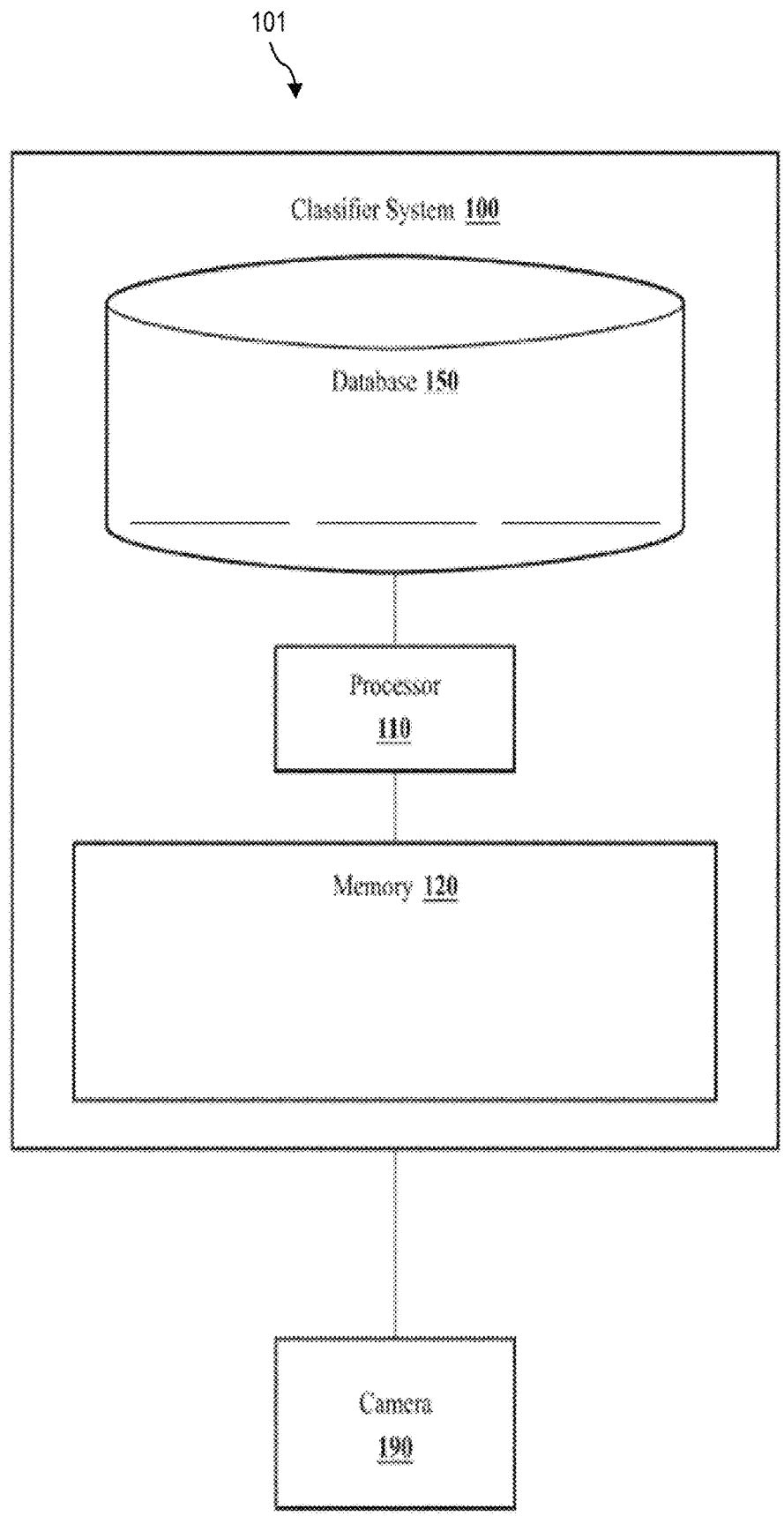
FIG. 1 illustrates an example of a classifier system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

A robotic device may use one or more sensors to identify objects in an environment. The sensors may include a red-green-blue (RGB) camera, radio detection and ranging (RADAR) sensor, light detection and ranging (LiDAR) sensor, or another type of sensor. Conventionally, perception software is used to recognize objects that were included in a training set. Objects in the training set may be referred to as known objects or old objects. Objects that were not used for training may be referred to as unknown objects or new objects. When a classifier is confronted with an unknown object, the classifier may select a most similar known object. However, this selection may be incorrect.

Aspects of the present disclosure are directed to systems and methods for training a robotic system to identify new or unknown objects based on elements and features of learned/known objects. The robotic system may also be referred to as a robotic device or robot. The robotic system may be autonomous or semi-autonomous.

The objects may include man-made objects (e.g., chairs, desks, cars, books, etc.), natural objects (e.g., rocks, fruits, trees, animals, etc.), and humans. In one aspect, the robotic system predicts an N dimensional vector or multi-dimensional vector for each detected object. For example, the robotic system predicts a sixteen (16) dimensional vector. In some aspects, the multiple dimensional vector may include any value between ten (10) and twenty (20). Of course, other values may be used. A multi-dimensional vector may be predicted for each pixel of multiple pixels associated with each known object. A feature vector representing characteristics of the known object are allocated to each pixel of the known objects. Each pixel may be associated with multiple feature vectors that are based on images obtained from different views/angles.

Given a training set of objects, a neural network is encoded with N dimensional vectors or multiple dimensional vectors for different objects. The values of the multiple dimensional vector may capture feature vectors or embeddings of the objects, such as shape, color, size, texture, or the like. As a result, an unknown object, which is different from an object that the classifier is trained on, can be identified based on the multiple dimensional vectors of the different objects.

For example, a neural network may be trained on five different types of fruits and may be later introduced to an unknown fruit that is different than all the others. In one aspect, an image of an environment including the unknown fruit may be captured by a sensor of the robotic device. For example, a neural network associated with the robotic device generates an output of the unknown fruit from the image. The output includes a feature vector of the unknown fruit. The feature vector may be a multiple dimensional vector. The feature vector may be determined for each pixel of the unknown fruit.

A neural network architecture used in the present disclosure includes a network layer (e.g., a convolutional layer) that receives an input, and performs a number of convolutions, with the final output being a tensor. In one aspect, a feature vector associated with the tensor includes a same number of rows and columns as the image. However, instead of having three channels as in conventional tensors, the tensor may include N-channels (e.g., sixteen) for each pixel (e.g., pixel coordinate). For example, for every pixel of an initial image that is processed by the network there may be sixteen values for each pixel at the output.

The neural network may use features (e.g., the feature vectors) of the unknown fruit to infer the type of the unknown fruit. The neural network associated with the robotic device compares the feature vector of the unknown fruit to feature vectors of the known fruits. Based on the comparison, the neural network may classify the unknown fruit.

For example, the neural network may determine the color of the fruit based on knowledge of the color of known fruits. Moreover, the neural network may determine that the texture is more similar to a texture of a known fruit. The texture, and the color may be defined by one or more values of the multiple dimensional vector that classify the unknown fruit. Additionally, a shape of the fruit may be identified based on the shapes of known fruits. The shape is also be defined as one or more of the values of the multiple dimensional vector.

When a classifier is trained on objects corresponding to different classes, an unknown object that shares characteristics with an object of a training class can be identified based on the similarity to trained characteristics. The neural network determines the differences and similarities between the unknown object and the known objects. For example, the neural network determines whether a difference and/or a similarity between the feature vector of the unknown fruit and the feature vector of a known fruit satisfies a threshold. The selected known fruit may be the known fruit that is most similar to the unknown fruit. For example, the texture and the shape of the unknown fruit is similar to the lime. Thus, in this case the selected one of the known fruits is the lime.

The neural network then infers or identifies the unknown fruit based on the determination using the threshold. For example, the unknown fruit is identified as a lime when the similarity between the feature vector of the unknown fruit and the one or more feature vectors of the lime is greater than a similarity threshold. In addition to the similarity comparison, a difference comparison may also be used to infer the type of the unknown fruit. For example, the unknown fruit is identified as a lime when the difference between the feature vector of the unknown fruit and the one or more feature vectors of the lime is less than a difference threshold.

In one aspect the unknown fruit may not be identifiable when the similarity between the feature vector of the sixth fruit and the one or more feature vectors of a specified known fruit (e.g., the lime) less than the similarity threshold. Alternatively or additionally, the unknown fruit may not be identifiable when the difference between the feature vector of the unknown fruit and the one or more feature vectors of the specified known fruit is greater than the difference threshold.

Accordingly, aspects of the present disclosure provide a network that is capable of learning unknown objects based on elements of trained objects. Specifically, the network learns (e.g., identifies) unknown objects by determining similarities and differences between characteristics of trained objects and the unknown object.

FIG. 1 illustrates an example of a classifier system 100. The classifier system 100 is implemented to perform methods and other functions as disclosed herein. It should be appreciated, that while the classifier system 100 is illustrated as being a single contained system, in various embodiments, the classifier system 100 is a distributed system that is comprised of components that can be provided as a centralized server, a cloud-based service, and so on.

The classifier system 100 includes a processor 110. The processor 110 may represent a distributed processing resource, an individual local processor (e.g., a CPU, GPU, or application specific processor), or the classifier system 100 may access the processor 110 through a data bus or another communication path. In one aspect, the classifier system 100 includes a memory 120. The memory 120 is a random-access memory (RAM), read-only memory (ROM), a hard-disk drive, a flash memory, a processor cache, or other suitable memory.

Aspects of the classifier system 100 may be implemented as cloud-based services (e.g., software as a service), centralized services, and/or other types of services. Additionally, the classifier system 100, in one or more aspects, includes a database 150 that is stored in a separate data store, in the memory 120, or in another suitable configuration. The database 150 may include image data of an object.

A machine learning module includes, in one aspect, a machine learning implementation such as a convolutional neural network (CNN) or other suitable deep learning algorithm.

In further aspects, the classifiers can be provided to a robotic device within which the classifier is to be implemented such that the classifier is stored in a local memory thereof. Thus, the robotic device may implement the classifier to analyze objects from a camera 190 so that the robotic device can recognize objects within an environment.

Figure 2:
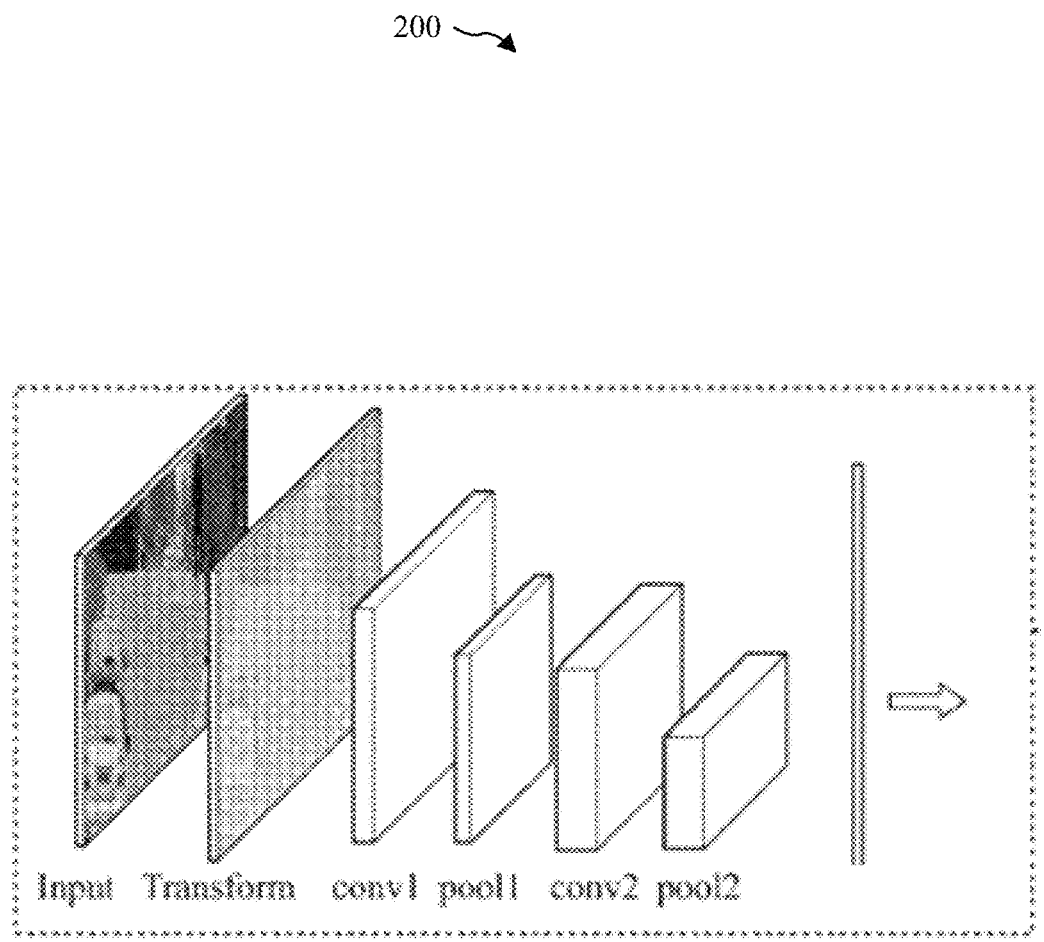
FIG. 2 illustrates an example architecture of a classifier, according to aspects of the present disclosure.

FIG. 2 provides an example architecture of a classifier 200. As illustrated, the classifier 200 includes a convolutional neural network (CNN). The classifier 200 may include a transform module to provide a transform of the input image. The classifier 200 pairs the machine learning implementation with a transformation implementation that perform pre-processing on input data (e.g., images). For example, the transformation module accepts inputs of images, executes the pre-processing on the input, and passes the transformed input to layers of convolutional nodes that form the CNN. In one configuration, each convolutional layer is followed by a max pooling layer, connected by, in one or more aspects, rectified linear activations (ReLu). The final convolutional layer feeds into a fully-connected ReLu layer.

Figure 3:
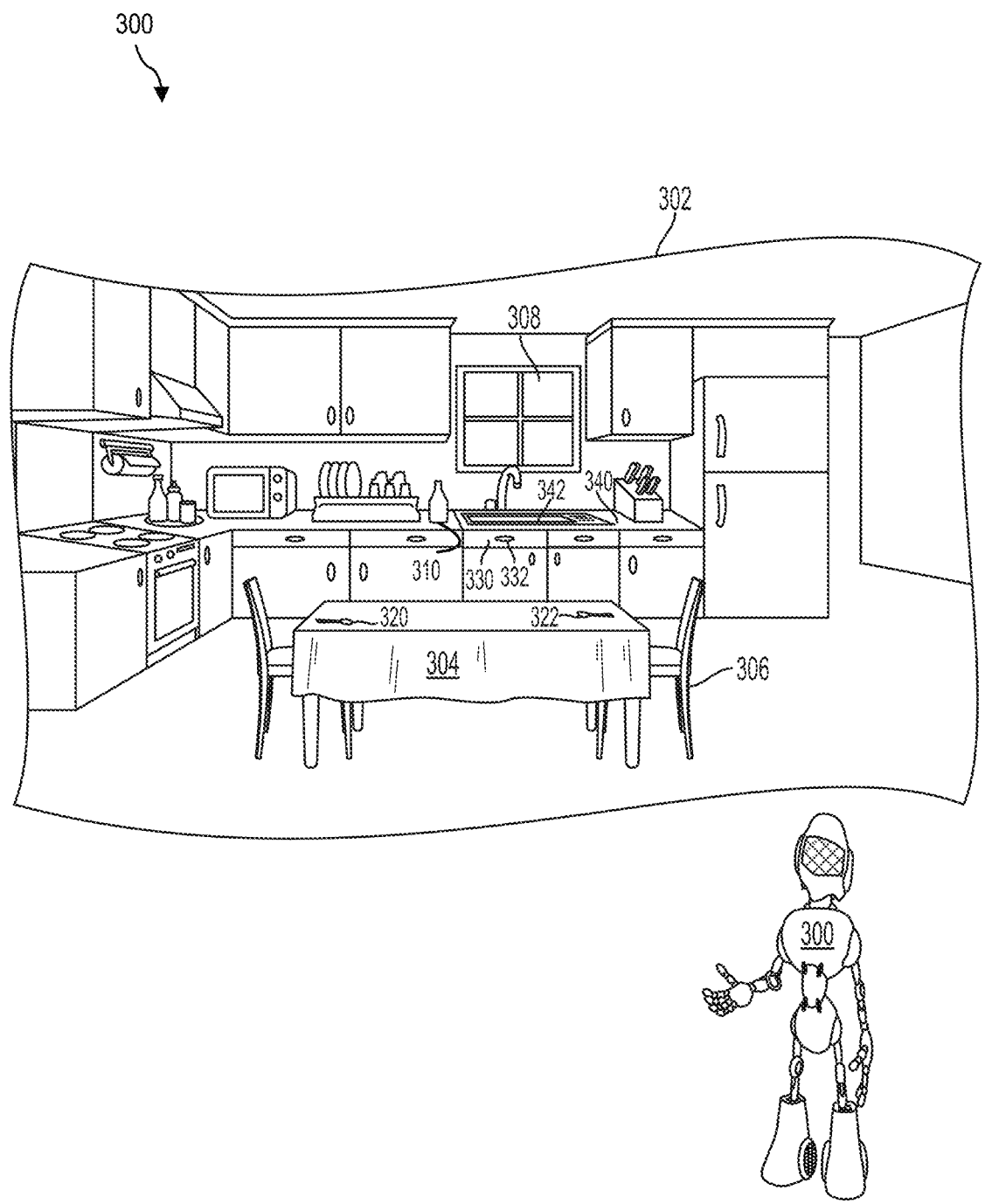
FIG. 3 illustrates an image of a training environment used to train a robot, according to aspects of the present disclosure.

FIG. 3 illustrates an image 301 of a training environment 302 used to train a robotic device 300, according to aspects of the present disclosure. In the example of FIG. 3, the robotic device 300 is a humanoid robot and the training environment 302 is a kitchen. Aspects of the present disclosure are not limited to a humanoid robot. The robotic device 300 may be any type of autonomous or semi-autonomous device, such as a drone or a vehicle. Additionally, the robotic device 300 may be in any type of environment. The robotic device 300 may be trained to identify unknown objects according to aspects of the present disclosure.

In one configuration, the robotic device 300 obtains the image 301 of the training environment 302 via one or more sensors of the robotic device 300. The robotic device 300 may detect and localize one or more objects in the image 301. Localization refers to determining the location (e.g., coordinates) of a detected object within the image 301. In conventional object detection systems, a bounding box may indicate the location of an object detected in the image 301. The detected objects may be one or more specific classes of objects, such as a table 304, a pushed-in chair 306, a closed window 308, a bottle 310, utensils 320 and 322, a counter 340, a sink 342, a cabinet 330 having a handle 332, or all objects in the image 301. The objects may be detected and identified using an object detection system, such as a pre-trained object detection neural network.

A 3D camera on the robotic device 300 captures images of the training environment 302 and an object (e.g., a lime or apple on the table) from different views/angles. A 3D model of the environment is generated from the captured images. The 3D model is used to create images from viewpoints that differ from the viewpoints of the image 301 captured by the 3D camera. For example, during training, the 3D camera captures the image of the object (e.g., apple) from an angle. Feature vectors for the object may be determined for the angle (e.g., view) of the 3D camera. In one aspect, the view from which the object is captured is extrapolated to a circle or some path around the object. Feature vectors from each view of the object are collected as an example of the object. In the context of neural networks, embeddings or feature vectors are low-dimensional, learned continuous vector representations of discrete variables.

Aspects of the present disclosure are directed to a system that uses an output (e.g., a sixteen dimensional output) of the neural network to teach the robotic device to identify unknown objects. For example, given the training set of objects, a neural network is encoded with N dimensional vectors for the different objects. The values of the N dimensional vector may capture feature vectors of the objects, such as shape, color, size, texture, or the like for each selected pixel of each of the training set of objects. As a result, an unknown object, which is different from an object that the classifier is trained on, can be identified based on the N dimensional vectors of the different trained objects. Thus, the robotic device identifies the unknown object after a training phase of the neural network.

For example, when a robotic device is tasked with identifying an unknown object, the neural network of the robotic device receives an image (e.g., an RGB image) as an input and outputs a feature vector including values assigned to each pixel of the image. The feature vector may include characteristics of the image encoded into a series of numbers to provide a numerical "fingerprint" for differentiating one feature from another. The feature vectors act as a feature descriptor that may establish per pixel correspondences of different images. Because feature vectors may be defined at each pixel, keyframes (images) may be as broad as including every pixel in the image, or as narrow as only using specified pixels or pixels in a user-defined mask.

In one aspect, the neural network (e.g., a dense embeddings network) processes the input image and outputs the N dimensional feature vector of the pixels of the image. Each pixel of the input image may correspond to a feature vector that is sixteen dimensional. A user may only select one pixel, or descriptor, of an image. The feature vectors and image may be combined to generate a voxel map. The feature vectors may also be input to a matcher (e.g., keyframe or image matcher) that compares the feature vectors of the pixels of the unknown object with feature vectors (e.g., feature vectors of known objects) of pixels of known objects.

In one aspect, the images of the set of training objects and the unknown object may be obtained from different view/angles. Each of the set of objects (e.g., an apple, a bottle, etc.) may be taught from different angles. In one aspect, the robotic device may extrapolate a selected pixel into a three dimensional representation. Thus, when the robotic device moves around, it can match feature vectors without interaction from a user. As such, an accuracy of the classifier may increase without further interaction from the user. Accordingly, the user interaction time is reduced. More data may be obtained due to the reduced user interaction time.

For example, the apple is taught from one angle, then the angle is extrapolated to a circle or some path around the apple. Feature vectors may be obtained for each view of the apple as an example of the apple. A number of examples of the apple can be obtained, which increases reliability of identification of the unknown object as the unknown object can be compared to feature vectors corresponding to different views/angles of the known object.

The feature of extrapolating a single pixel into a three dimensional representation of feature vectors is used to train the robotic device with different sets of training objects. The data from the training or teaching stage is fed into the robotic device and is used to recognize an unknown object. For example, consider a soda can that has a front and a back label where the front label is different from the back label. The ability to identify both the front label and the back label with a single selected pixel is advantageous because of the reduced interaction from the user.

In one aspect, the robotic device maps a pixel of an object to a three dimensional location using depth information and three dimensional features. As the robotic device moves around the same object, the robotic device can select the pixel of the object using depth information. The selected pixel is a three dimensional point, which is a first projected point corresponding to an initial pixel and an initial view point. As the robot moves, the three dimensional point can be re-projected into a new camera position or view point that represents the object. The feature vectors associated with the different viewpoints are matched to pixels of the object and stored for use in recognizing the unknown object.

Figure 4:
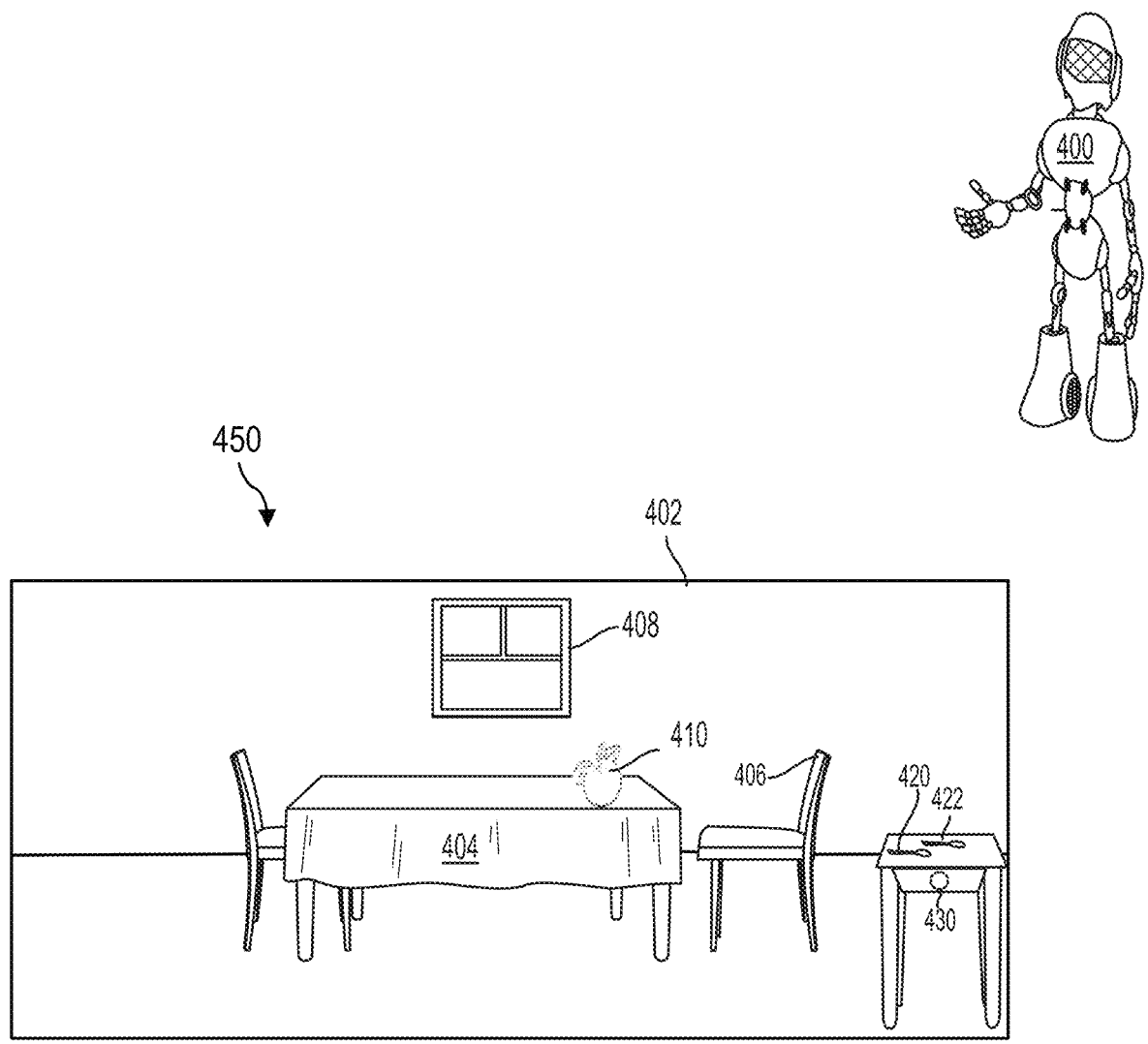
FIG. 4 illustrates an example of an image of an environment captured by a sensor of a robotic device, according to aspects of the present disclosure

FIG. 4 illustrates an example of an image 450 of an environment 402 captured by a sensor of a robotic device 400, according to aspects of the present disclosure. The sensor may be a three dimensional camera. The environment 402 is a dining area (e.g., a restaurant dining area) that includes an unknown object (e.g., an unknown fruit 410) on a table 404. The environment also includes a chair 406, a window 408, a cabinet 430 and utensils 420, 422 on the cabinet 430. In one example, the neural network associated with the robotic device 400 is trained on five different types of fruits (e.g., a banana, an apple, a lime, a blueberry, and a grape). The neural network is later introduced to the unknown fruit 410 that is different than all the others.

The neural network associated with the robotic device 400 may use feature vectors to infer or identify the type of the unknown fruit 410. In one aspect, the neural network compares the feature vector of the unknown fruit 410 to feature vectors of known fruits. For example, the neural network may determine the color of the unknown fruit 410 based on knowledge of the color of known fruit). Moreover, the neural network may determine that the texture of the unknown fruit 410 based on texture of known fruit. The round shape of the unknown fruit 410 may be determined to be the same as a shape of a known fruit.

The neural network determines the differences and similarities between the feature vectors of the unknown fruit 410 and the known fruits. For example, the neural network determines whether a difference and/or a similarity between the feature vector of the unknown fruit 410 and the feature vector of a selected one (e.g., the lime) of the known fruits meets a threshold. The neural network identifies the unknown fruit 410 based on the determination using the threshold.

For example, the unknown fruit 410 is identified as a lime when the similarity between the feature vector of the unknown fruit 410 and the one or more feature vectors of the lime is greater than a similarity threshold. In addition to the similarity comparison, a difference comparison may also be used to infer the type of the unknown fruit 410. In this example, the unknown fruit 410 is identified as a lime when the difference between the feature vector of the unknown fruit and the one or more feature vectors of the lime is less than a difference threshold.

Figure 5:
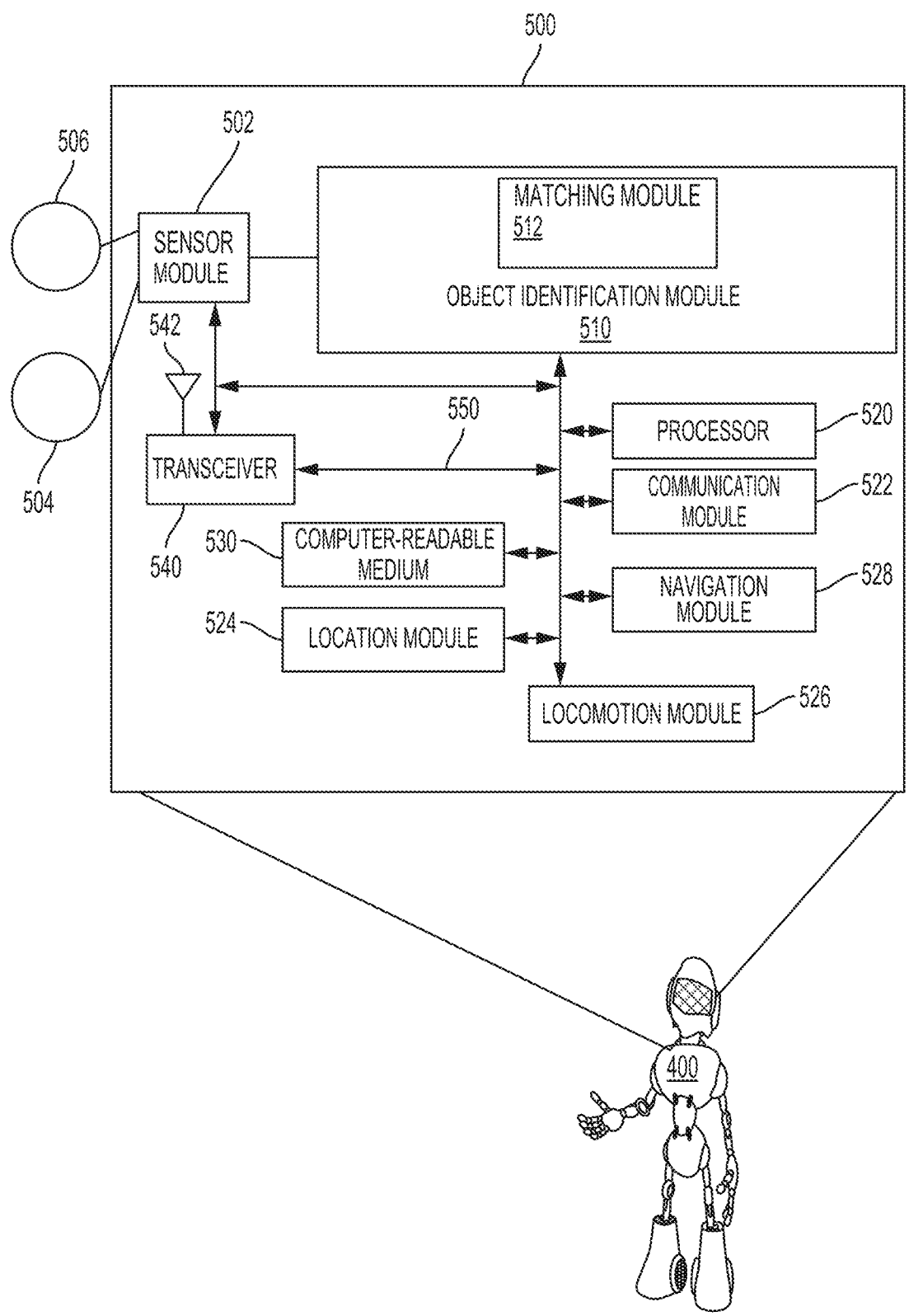
FIG. 5 is a diagram illustrating an example of a hardware implementation for a robotic device to recognize unknown objects, according to aspects of the present disclosure.

FIG. 5 is a diagram illustrating an example of a hardware implementation for an object identification system 500, according to aspects of the present disclosure. The object identification system 500 may be a component of a vehicle, a robotic device, or another device. For example, as shown in FIG. 5, the object identification system 500 is a component of a robotic device 400.

Aspects of the present disclosure are not limited to the object identification system 500 being a component of the robotic device 400. Other devices, such as a bus, boat, drone, or vehicle, are also contemplated for using the object identification system 500. The robotic device 400 may operate in at least an autonomous operating mode and a manual operating mode.

The object identification system 500 may be implemented with a bus architecture, represented generally by a bus 550. The bus 550 may include any number of interconnecting buses and bridges depending on the specific application of the object identification system 500 and the overall design constraints. The bus 550 links together various circuits including one or more processors and/or hardware modules, represented by a processor 520, a communication module 522, a location module 524, a sensor module 502, a locomotion module 526, a navigation module 528, and a computer-readable medium 530. The bus 550 may also link various other circuits such as timing sources, peripherals, voltage regulators, and power management circuits, which are well known in the art, and therefore, will not be described any further.

The object identification system 500 includes a transceiver 540 coupled to the processor 520, the sensor module 502, an object identification module 510, an object matching module 512, the communication module 522, the location module 524, the locomotion module 526, the navigation module 528, and the computer-readable medium 530. The transceiver 540 is coupled to an antenna 542. The transceiver 540 communicates with various other devices over a transmission medium. For example, the transceiver 540 may receive commands via transmissions from a user or a remote device. As another example, the transceiver 540 may transmit statistics and other information from the object identification module 510 to a server (not shown).

The object identification system 500 includes the processor 520 coupled to the computer-readable medium 530. The processor 520 performs processing, including the execution of software stored on the computer-readable medium 530 to provide functionality according to the disclosure. The software, when executed by the processor 520, causes the object identification system 500 to perform the various functions described for a particular device, such as the robotic device 400, or any of the modules 502, 510, 512, 522, 524, 526, and 528. The computer-readable medium 530 may also be used for storing data that is manipulated by the processor 520 when executing the software.

The sensor module 502 may obtain measurements via different sensors, such as a first sensor 504 and a second sensor 506. The first sensor 504 may be a vision sensor, such as a stereoscopic camera or a red-green-blue (RGB) camera, for capturing 3D images. The second sensor 506 may be a ranging sensor, such as a light detection and ranging (LiDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the first sensor 504 and the second sensor 506.

The measurements of the first sensor 504 and the second sensor 506 may be processed by one or more of the processor 520, the sensor module 502, the object identification module 510, the communication module 522, the location module 524, the locomotion module 526, the navigation module 528, in conjunction with the computer-readable medium 530 to implement the functionality described herein. In one configuration, the data captured by the first sensor 504 and the second sensor 506 may be transmitted to an external device via the transceiver 540. The first sensor 504 and the second sensor 506 may be coupled to the robotic device 400 or may be in communication with the robotic device 400.

The location module 524 may determine a location of the robotic device 400. For example, the location module 524 may use a global positioning system (GPS) to determine the location of the robotic device 400. The communication module 522 may facilitate communications via the transceiver 540. For example, the communication module 522 may be configured to provide communication capabilities via different wireless protocols, such as Wi Fi, long term evolution (LTE), 5G, etc. The communication module 522 may also be used to communicate with other components of the robotic device 400 that are not modules of the object identification system 500.

The locomotion module 526 may facilitate locomotion of the robotic device 400. As another example, the locomotion module 526 may be in communication with one or more power sources of the robotic device 400, such as a motor and/or batteries. The locomotion may be proved via wheels, moveable limbs, propellers, treads, fins, jet engines, and/or other sources of locomotion.

The robotic device 400 may use one or more sensors, such as the first sensor 504 and the second sensor 506 to identify objects in an environment. The sensors may include a red-green-blue (RGB) camera, radio detection and ranging (RADAR) sensor, light detection and ranging (LiDAR) sensor, or another type of sensor. In one aspect, an image of the environment is received by the object identification system 500 of the robotic device 400. The object identification system 500 includes an object identification module 510 that generates an output of the unknown object identified in the image of the environment. The output includes a feature vector of the unknown object.

The object identification module 510 may include an object matching module 512 (e.g., keyframe or image matcher). For example, the feature vectors may be input to the object matching module 512, which compares the feature vectors of the pixels of the unknown object with feature vectors of pixels of known objects. The object identification module 510 determines whether a difference and/or a similarity between the feature vector of the unknown object and the feature vector of a selected one of the known objects meets a threshold. The object identification module 510 then identifies the unknown object based on the determination. The modules may be software modules running in the processor 520, resident/stored in the computer-readable medium 530, one or more hardware modules coupled to the processor 520, or some combination thereof.

The object identification module 510 may be in communication with the sensor module 502, the transceiver 540, the processor 520, the communication module 522, the location module 524, the locomotion module 526, the navigation module 528, and the computer-readable medium 530. In one configuration, the object identification module 510 receives sensor data from the sensor module 502. The sensor module 502 may receive the sensor data from the first sensor 504 and the second sensor 506. According to aspects of the present disclosure, the sensor module 502 may filter the data to remove noise, encode the data, decode the data, merge the data, extract frames, or perform other functions. In an alternate configuration, the object identification module 510 may receive sensor data directly from the first sensor 504 and the second sensor 506.

In one configuration, the object identification module 510 identifies detected objects based on information from the processor 520, the location module 524, the computer-readable medium 530, the first sensor 504, and/or the second sensor 506.

Figure 6:
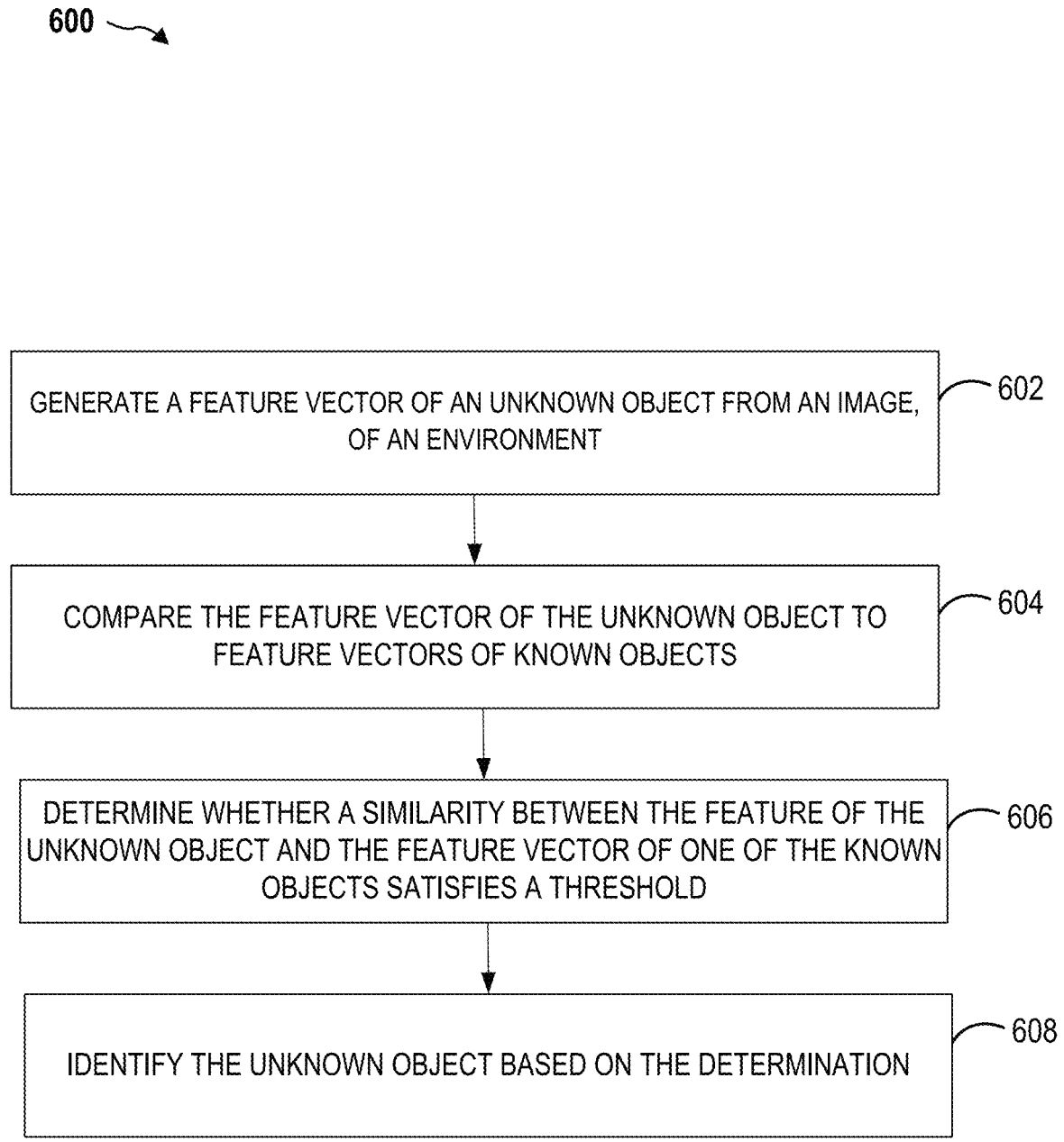
FIG. 6 illustrates a method for a robotic device to recognize unknown objects, according to an aspect of the present disclosure.

FIG. 6 illustrates a method 600 for a robotic device to recognize an unknown objects, according to an aspect of the present disclosure. At block 602, a feature vector of an unknown object from an image of an environment is generated. At block 604, the feature vector of the unknown object is compared to feature vectors of known objects. At block 606, the robotic device determines whether a similarity between the feature vector of the unknown object and the feature vector of one of the known objects satisfies a threshold. At block 608, the robotic device identifies the unknown object based on the determination.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for identifying objects, comprising:
generating a feature vector of an unknown object from an image of an environment, in which the feature vector encodes information into a series of numbers to provide a numerical fingerprint for differentiating one feature from another;
comparing the numerical fingerprint of the unknown object to numerical fingerprints of known objects of a trained object class, in which each of the known objects comprises multiple numerical fingerprints, and each of the multiple numerical fingerprints is based on images obtained from different views of the known objects to identify the known objects in the different views;
determining whether a similarity between the numerical fingerprint of the unknown object and the numerical fingerprints of one of the known objects satisfies a threshold;
identifying the unknown object based on the determining; and
inferring that the unknown object is in the same trained object class as one of the known objects of the trained object class when a difference between the numerical fingerprints of the known objects and the unknown object is less than the threshold and/or the similarity between the numerical fingerprints of the known objects and the unknown object is greater than the threshold.

2. The method of claim 1, in which the numerical fingerprint of the unknown object and the numerical fingerprints of each of the known objects comprise a multi-dimensional vector.

3. The method of claim 1, in which the numerical fingerprint of the unknown object and the numerical fingerprints of each of the known objects correspond to characteristics comprising at least one of shape, color, size, and texture.

4. The method of claim 1, in which:
the numerical fingerprint of the unknown object comprises a same number of rows and columns as the image, and
the numerical fingerprint of the unknown object comprises N-channels for each pixel or descriptor of the image.

5. A system for identifying objects, comprising:
a memory; and
at least one processor, the at least one processor configured:
to generate a feature vector of an unknown object from an image of an environment, in which the feature vector encodes information into a series of numbers to provide a numerical fingerprint for differentiating one feature from another;
to compare the numerical fingerprint of the unknown object to numerical fingerprints of known objects of a trained object class, in which each of the known objects comprises multiple numerical fingerprints, and each of the multiple numerical fingerprints is based on images obtained from different views of the known objects to identify the known objects in the different views;
to determine whether a similarity between the numerical fingerprint of the unknown object and the numerical fingerprints of one of the known objects satisfies a threshold;
to identify the unknown object based on the determination, and
to infer that the unknown object is in the same trained object class as one of the known objects of the trained object class when a difference between the numerical fingerprints of the known objects and the unknown object is less than the threshold and/or the similarity between the numerical fingerprints of the known objects and the unknown object is greater than the threshold.

6. The system of claim 5, in which the numerical fingerprint of the unknown object and the numerical fingerprints of each of the known objects comprise a multi-dimensional vector.

7. The system of claim 5, in which the numerical fingerprint of the unknown object and the numerical fingerprints of each of the known objects correspond to characteristics comprising a shape, color, size, and/or texture.

8. The system of claim 5, in which:
the numerical fingerprint of the unknown object comprises a same number of rows and columns as the image, and
the numerical fingerprint of the unknown object comprises N-channels for each pixel or descriptor of the image.

9. A non-transitory computer-readable medium having program code recorded thereon to identify objects, the program code being executed by a processor and comprising:
program code to generate a feature vector of an unknown object from an image of an environment, in which the feature vector encodes information into a series of numbers to provide a numerical fingerprint for differentiating one feature from another;
program code to compare the numerical fingerprint of the unknown object to numerical fingerprints of known objects of a trained object class, in which each of the known objects comprises multiple numerical fingerprints, and each of the multiple numerical fingerprints is based on images obtained from different views of the known objects to identify the known objects in the different views;
program code to determine whether a similarity between the numerical fingerprint of the unknown object and the numerical fingerprints of one of the known objects satisfies a threshold;
program code to identify the unknown object based on the determination; and
program code to infer that the unknown object is in the same trained object class as one of the known objects of the trained object class when a difference between the numerical fingerprints of the known objects and the unknown object is less than the threshold and/or the similarity between the numerical fingerprints of the known objects and the unknown object is greater than the threshold.

10. The non-transitory computer-readable medium of claim 9, in which the numerical fingerprint of the unknown object and the numerical fingerprints of each of the known objects comprise a multi-dimensional vector.

11. The non-transitory computer-readable medium of claim 9, in which the numerical fingerprint of the unknown object and the numerical fingerprints of each of the known objects correspond to characteristics comprising shape, color, size, and/or texture.

12. The non-transitory computer-readable medium of claim 9, in which:
the numerical fingerprint of the unknown object comprises a same number of rows and columns as the image, and
the numerical fingerprint of the unknown object comprises N-channels for each pixel or descriptor of the image.

\* \* \* \* \*